(12) United States Patent
Seal et al.

(10) Patent No.: US 10,878,405 B2
(45) Date of Patent: Dec. 29, 2020

(54) SMART REDUNDANT PAIRING OF A CARD READER

(71) Applicant: Shopify Inc., Ottawa (CA)

(72) Inventors: David Grant Seal, Ottawa (CA); Daanish Bilal Maan, Brampton (CA); Michael Joseph DeFazio, Fonthill (CA); David Gervis Waddell, Toronto (CA)

(73) Assignee: Shopify Inc., Ottawa (CA)

( * ) Notice: Subject to any disclaimer, the term of this patent is extended or adjusted under 35 U.S.C. 154(b) by 120 days.

(21) Appl. No.: 16/211,352

(22) Filed: Dec. 6, 2018

(65) Prior Publication Data
US 2020/0184461 A1   Jun. 11, 2020

(51) Int. Cl.
*G06Q 20/34* (2012.01)
*G06K 7/00* (2006.01)
*G06Q 20/40* (2012.01)
*G06K 7/10* (2006.01)
*G06K 7/14* (2006.01)

(52) U.S. Cl.
CPC ......... *G06Q 20/353* (2013.01); *G06K 7/0013* (2013.01); *G06Q 20/409* (2013.01); *G06K 7/10297* (2013.01); *G06K 7/1413* (2013.01)

(58) Field of Classification Search
CPC ........ G06K 19/00; G06Q 20/20; G06Q 20/24; G06Q 20/40
USPC .............................. 235/380, 375, 487; 705/5
See application file for complete search history.

(56) References Cited

U.S. PATENT DOCUMENTS

| | | | | |
|---|---|---|---|---|
| 2003/0208446 A1* | 11/2003 | Janne | ..................... | G06Q 20/06 705/41 |
| 2011/0112968 A1* | 5/2011 | Florek | ................ | G06Q 20/3226 705/50 |
| 2011/0179405 A1* | 7/2011 | Dicks | ........................ | G06F 8/61 717/168 |
| 2012/0075799 A1* | 3/2012 | Pollex | ................... | G06F 1/1622 361/679.56 |
| 2013/0144792 A1* | 6/2013 | Nilsson | ................... | G06Q 20/32 705/67 |
| 2014/0372198 A1* | 12/2014 | Goldfinger | ......... | G06Q 30/0201 705/14.33 |

* cited by examiner

*Primary Examiner* — Edwyn Labaze
(74) *Attorney, Agent, or Firm* — GTC Law Group PC & Affiliates

(57) ABSTRACT

Systems and methods are provided for communicating information between card readers and mobile devices. The systems and methods include providing a physical communication connection from a card reader to a mobile device. With the mobile device, determining whether successful physical connection to the card reader has been established and determining whether a wireless connection has been established with the card reader. If a wireless communication connection has not been established with the card reader, establishing a wireless communication connection with the card reader and continuously monitoring whether the physical communication connection and the wireless communication connection with the card reader continues and communicating information between the card reader and the mobile device using both the connections as long as either continues. Further, only the wireless communication connection or the physical communication connection between the mobile device and the card device is utilized when the other communication connection is not available.

28 Claims, 7 Drawing Sheets

SMART REDUNDANT PAIRING OF A CARD READER

FIELD

The present disclosure relates generally to systems and methods of communication between electronic devices and more specifically to systems and methods of wired and wirelessly communicating information between a peripheral and a mobile device.

BACKGROUND

Terminals may be generally classified as mobile/portable terminals or stationary terminals according to their mobility. Mobile terminals may also be classified as handheld terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. More recently, mobile terminals have been configured to connect to peripheral devices, including card readers employing magnetic strip and chip technologies as well as communicating with other mobile device employing near field communication technologies for mobile payments. These peripherals can limit the mobility of the device or its ability to connect to the peripheral when the device changes locations.

SUMMARY

Systems and methods are provided herein for communicating payment information between a payment card reader and a mobile device. The methods and system further include providing a physical communication connection from the payment card reader to the mobile device; with the mobile device, determining that a successful physical connection to the payment card reader has been established; determining whether a wireless communication connection has been established with the payment card reader; if a wireless communication connection has not been established with payment card reader, establishing a wireless communication connection with the payment card reader; and continuously monitoring whether the physical communication connection with the payment card reader continues and communicating information between the payment card reader and the mobile device using the physical communication connection as long as it continues and utilizing the wireless communication connection between the mobile device and the payment card device when the physical communication connection is not available.

In other embodiments of the methods and systems, the wireless communication connection is Bluetooth.

In other embodiments of the methods and systems, the physical communication connection is USB.

In other embodiments of the methods and systems, the mobile device is a tablet.

In other embodiments of the methods and systems, the physical communication connection is used by the mobile device to communicate credentials for authenticating the mobile device to the wireless communication connection.

In other embodiments of the methods and systems, the physical communication connection is used by the mobile device to communicate credentials for authenticating the mobile device to payment card reader.

In other embodiments of the methods and systems, the payment card reader is adapted to communicate with cards for identifying the existence of customers within a retail location.

In other embodiments of the methods and systems, the identification of a customer within the retail location authenticates the presence of a customer for a customer loyalty program, for authenticating customer membership for admittance to the retail location, for notifying retail staff of customer details, for presenting the customer with a personalized offer or greeting, or for notifying staff of the presence of customers meeting certain criteria.

In other embodiments of the methods and systems, the payment card reader is adapted to identify a product presented to the payment card reader and provide further information about the product.

In other embodiments of the methods and systems, the payment card reader is adapted to facilitate checkout of the product.

In other embodiments of the methods and systems, the payment card reader is adapted to facilitate access to high value products located in secure location.

In other embodiments of the methods and systems, the product is identified by reading a bar code or near field communication (NFC) tag associated with the product.

Also provided are systems and methods for a point of sale device. The methods and systems for a point of sale device include a payment card reader; and a mobile device adapted to operate as a point of sale device for presenting information about goods or services being purchased, the mobile device capable of simultaneous physical and wireless communication connections with the payment card reader, wherein the mobile device continuously monitors whether the physical communication connection with the payment card reader continues and communicates information between the payment card reader and the mobile device using the physical communication connection as long as the physical communication connection continues and utilizes the wireless communication connection between the mobile device and the payment card reader when the physical communication connection is not available.

In other embodiments, the methods and systems further include a stand comprising a base portion and a mobile device portion wherein the mobile device portion is attached to the mobile device, the base portion comprising a rotating lock ring that mates with the mobile device portion as the lock ring is rotated to removably attach the mobile device portion with the base portion.

In other embodiments of the methods and systems, the physical communication connection is made between the base portion and the mobile device portion automatically as the base portion and mobile device portion are attached.

In other embodiments, the methods and systems further include raised ribs on a locking ring of a base portion that selectively mate with mobile device portion.

In other embodiments of the methods and systems, the payment card reader separately presents information to customers paying with a payment card on a display of the payment card reader.

In other embodiments of the methods and systems, software associated with the mobile device determines whether information is transmitted through the physical or wireless communication connection.

In other embodiments of the methods and systems, the mobile device and physical communication connection are adapted to communicate credentials for authenticating the mobile device to the wireless communication connection.

In other embodiments of the methods and systems, the payment card reader is adapted to communicate with cards for identifying the existence of customers within a retail location.

In other embodiments of the methods and systems, the identification of a customer within the retail location authenticates the presence of a customer for a customer loyalty program, for authenticating customer membership for admittance to the retail location, for notifying retail staff of customer details, for presenting the customer with a personalized offer or greeting, or for notifying staff of the presence of customers meeting certain criteria.

In other embodiments of the methods and systems, the payment card reader is adapted to identify a product presented to the payment card reader and provide further information about the product.

In other embodiments of the methods and systems, the payment card reader is adapted to facilitate checkout of the product.

In other embodiments of the methods and systems, the payment card reader is adapted to facilitate access to high value products located in secure location.

In other embodiments of the methods and systems, the product is identified by reading a bar code or near field communication (NFC) tag associated with the product.

Also provided are systems and methods including a peripheral device and a mobile device, the mobile device capable of simultaneous physical and wireless communication connections with the peripheral device, wherein the mobile device continuously monitors whether the physical communication connection with the peripheral device continues and communicates information between the peripheral device and the mobile device using the physical communication connection as long as the physical communication connection continues and utilizes the wireless communication connection between the mobile device and the peripheral device when the physical communication connection is not available.

In embodiments, the systems and methods further include a stand comprising a base portion and a mobile device portion wherein the mobile device portion is attached to the mobile device, the base portion comprising a rotating lock ring that mates with the mobile device portion as the lock ring is rotated to removably attach the mobile device portion with the base portion.

In other embodiments of the methods and systems, the physical communication connection is made between the base portion and the mobile device portion automatically as the base portion and mobile device portion are attached.

In other embodiments, the systems and methods further include raised ribs on a locking ring of a base portion that selectively mate with mobile device portion.

In other embodiments of the methods and systems, the peripheral device presents information to a user on a display of the peripheral device.

In other embodiments of the methods and systems, software associated with the mobile device determines whether information is transmitted through the physical or wireless communication connection.

In other embodiments of the methods and systems, the mobile device and physical communication connection are adapted to communicate credentials for authenticating the mobile device to the wireless communication connection.

In other embodiments of the methods and systems, the peripheral device is adapted to communicate with cards for identifying the existence of customers within a retail location.

In other embodiments of the methods and systems, the identification of a customer within the retail location authenticates the presence of a customer for a customer loyalty program, for authenticating customer membership for admittance to the retail location, for notifying retail staff of customer details, for presenting the customer with a personalized offer or greeting, or for notifying staff of the presence of customers meeting certain criteria.

In other embodiments of the methods and systems, the peripheral device is adapted to identify a product presented to the peripheral device and provide further information about the product.

In other embodiments of the methods and systems, the peripheral device is adapted to facilitate checkout of the item.

In other embodiments of the methods and systems, the peripheral device is adapted to facilitate access to high value products located in secure location.

In other embodiments of the methods and systems, the product is identified by reading a bar code or near field communication (NFC) tag associated with the product.

Also provided are systems and methods for communicating information between a card reader and a mobile device. The systems and methods include providing a physical communication connection from the card reader to the mobile device; with the mobile device, determining that a successful physical connection to the card reader has been established; determining whether a wireless communication connection has been established with the card reader; if a wireless communication connection has not been established with the card reader, establishing a wireless communication connection with the card reader; and continuously monitoring whether the physical communication connection and the wireless communication connection with the card reader continues and communicating information between the card reader and the mobile device using both the physical communication connection and the wireless communication connection as long as either continues and utilizing only the wireless communication connection or the physical communication connection between the mobile device and the card device when the other communication connection is not available.

In other embodiments of the methods and systems, the card reader is a payment card reader.

In other embodiments of the methods and systems, the physical communication connection is used to communicate credentials for authenticating the mobile device to the wireless communication connection.

In other embodiments of the methods and systems, the card reader is adapted to communicate with cards for identifying the existence of customers within a retail location.

In other embodiments of the methods and systems, the identification of a customer within the retail location authenticates the presence of a customer for a customer loyalty program, for authenticating customer membership for admittance to the retail location, for notifying retail staff of customer details, for presenting the customer with a personalized offer or greeting, or for notifying staff of the presence of customers meeting certain criteria.

In other embodiments of the methods and systems, the card reader is adapted to identify a product presented to the card reader and provide further information about the product.

In other embodiments of the methods and systems, the card reader is adapted to facilitate checkout of the product.

In other embodiments of the methods and systems, the card reader is adapted to facilitate access to high value products located in secure location.

In other embodiments of the methods and systems, the product is identified by reading a bar code or near field communication (NFC) tag associated with the product.

DETAILED DESCRIPTION

The present disclosure will now be described in detail by describing various illustrative, non-limiting embodiments thereof with reference to the accompanying drawings and exhibits. The disclosure may, however, be embodied in many different forms and should not be construed as being limited to the illustrative embodiments set forth herein. Rather, the embodiments are provided so that this disclosure will be thorough and will fully convey the concept of the disclosure to those skilled in the art.

Figure 1:
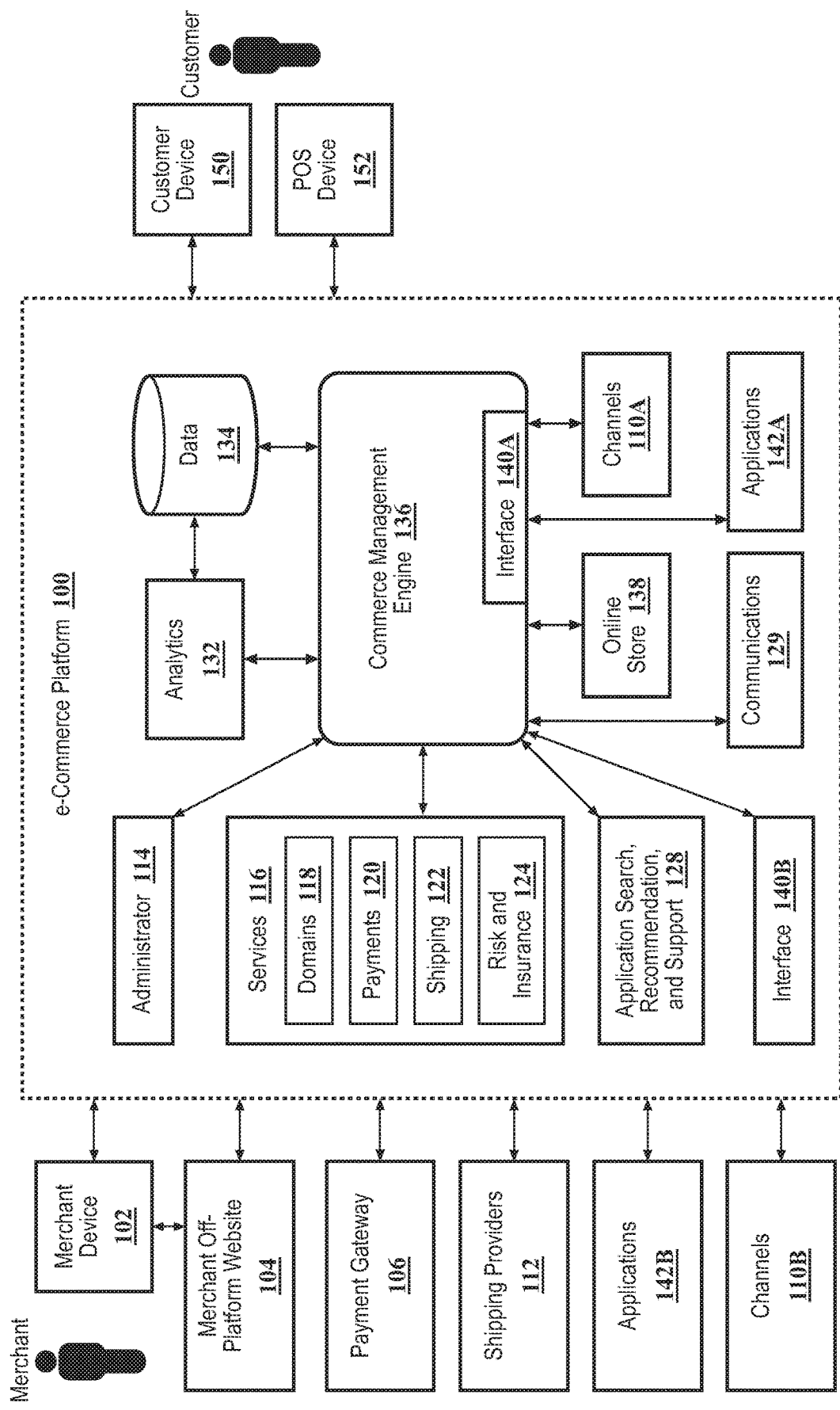
FIG. 1 depicts an embodiment of an e-commerce platform.

With reference to FIG. 1, an embodiment e-commerce platform 100 is depicted for providing merchant products and services to customers. While the disclosure throughout contemplates using the apparatus, system, and process disclosed to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform web site 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as s service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
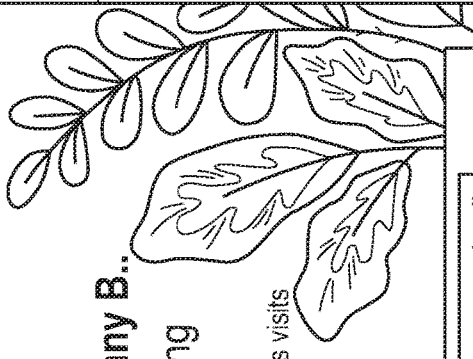
FIG. 2 depicts an embodiment of a home page of an administrator.

FIG. 2 depicts a non-limiting embodiment for a home page of an administrator 114, which may show information about daily tasks, a store's recent activity, and the next steps a merchant can take to build their business. In embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's back account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In embodiments, an application 142A may be provided by the same party providing the platform 100 or by a different party. In embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In embodiments, rather than violating the isolation principle, it may be preferred to move these components out of the commerce management engine 136 and into their own infrastructure within the e-commerce platform 100.

In embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In embodiments, core products, core extension points, applications, and the administrator 114 may be developed to work together. For instance, application extension points may be built inside the administrator 114 so that core features may be extended by way of applications, which may deliver functionality to a merchant through the extension.

In embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page, and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In embodiments, partners, application developers, internal applications facilities, and the like, may be provided with a software development kit (SDK), such as through creating a frame within the administrator 114 that sandboxes an application interface. In embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In embodiments, update events may be queued and processed asynchronously from a state change that triggered them, which may produce an update event notification that is not distributed in real-time.

In embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In embodiments, the payment gateway 106 may accept international payment, such as integrating with leading international credit card processors. The card server environment may include a card server application, card sink, hosted fields, and the like. This environment may act as the secure gatekeeper of the sensitive credit card information. In embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represent an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In embodiments, the e-commerce platform 100 may enable merchants to keep track of changes to the contract of sales over time, such as implemented through a sales model component (e.g., an append-only date-based ledger that records sale-related events that happened to an item).

Figure 3:
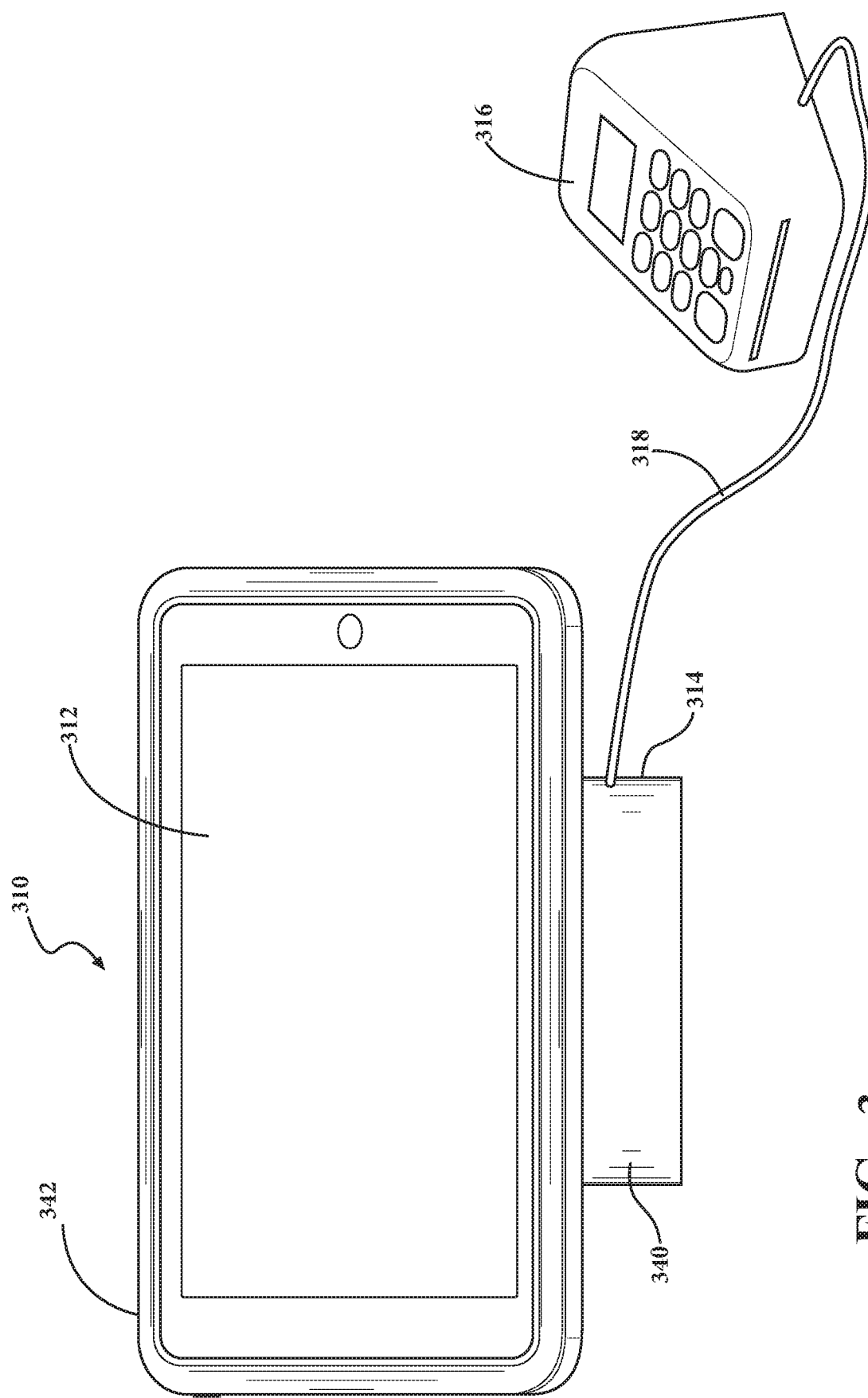
FIG. 3 depicts a mobile device in a tablet stand physically connected to a payment card reader according to an embodiment.

An embodiment of the present disclosure relates to secure accessory connection of a mobile device to a secure peripheral accessory using redundant technologies for pairing of the mobile device to the accessory. In embodiments, the secure accessory connection of a mobile device to a secure peripheral accessory can be implemented in conjunction with the e-commerce platform 100 described herein. In that regard and referring to FIG. 3 there is shown a mobile device 310 (which may be a merchant device 102) having an interactive display 312 and removably mounted to a mobile device stand 314, such that the device may be easily used as a point of sale device (which may be a POS device 152). In this embodiment, the mobile device can be a tablet, mobile phone, laptop computer or the like. As a point of sale device, for example, the mobile device 310 can interact with a customer to provide information about goods or services being purchased and provide an interface for making and authorizing payment. Preferably, the mobile device operates software for providing point of sale features, such as an interface for managing the checkout process and clearing payment card transactions. In this embodiment, the mobile device 310 is paired with a secure accessory, such as a payment card reader 316 that is used for reading debit and credit cards of customers to complete transactions.

In another embodiment, the card reader has a display and/or ability to a present audible feedback including an interface for facilitating the communication between a customer and payment card reader or mobile device.

Payment card readers 316 may be connected to mobile devices in a number of ways. Utilizing a wired connection, such as a wire 318 used to connect through Universal Serial Bus (USB), Ethernet, Lightning, Thunderbolt, Firewire other wired connection technology, provides a higher level of reliability and security. However, these types of connections limit the mobility of the mobile device 310 by tethering it to the payment card reader 316. Such a system requires the card reader to be disconnected from the mobile device to regain mobility, thereby effectively removing the ability of the device to accept card payments. The wired communication connection can be provided directly to the mobile device 310 or to the mobile device through a mobile device case or stand that supports the mobile device. Utilizing wireless connections, such as Bluetooth, allows the payment card reader 316 to remain connected to the mobile device 310, but are less reliable and less secure.

In an embodiment, the payment card reader 316 and mobile device 310 employ systems and methods for redundant simultaneous connection of the payment card reader 316 to the mobile device 310. The payment card reader 316 is connected using a secure physical connection, such as with wire 318, to the mobile device 310. After the payment card reader 316 connects to the mobile device 310, and software operating on the mobile device 310, using a physical connection, the mobile device 310 and payment card reader 316 initiate a simultaneous connection via a wireless communication technology. The wireless connection is redundant and is not used while a physical connection is present.

If the payment card reader 316 is physically disconnected from the mobile device 310, or there is failed connection, the redundant wireless connection is used to perform normal operations. In doing so, when the mobile device 310 is disconnected from the payment card reader 316 to use the device in different location, the mobile device 310 remains connected to the payment card reader 316 and can continue to accept payments from customers while the device is used remotely. When a physical connection is later re-established between the mobile device 310 and the payment card reader 316, the physical connection, rather than the wireless connection, is utilized for communication between the payment card reader 316 and the mobile device 310.

Figure 4:
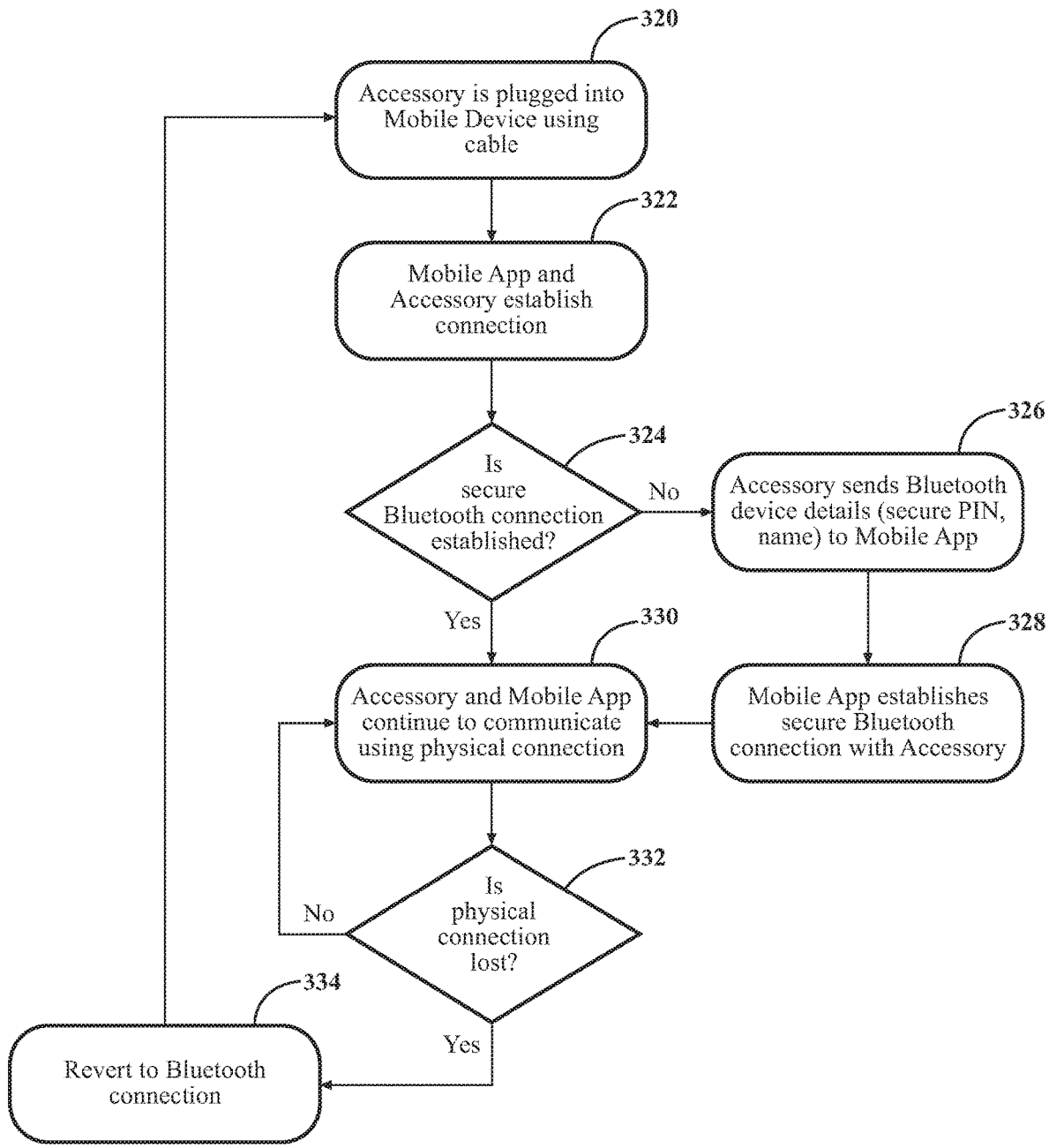
FIG. 4 depicts a flow chart according to an embodiment.
Figure 5:
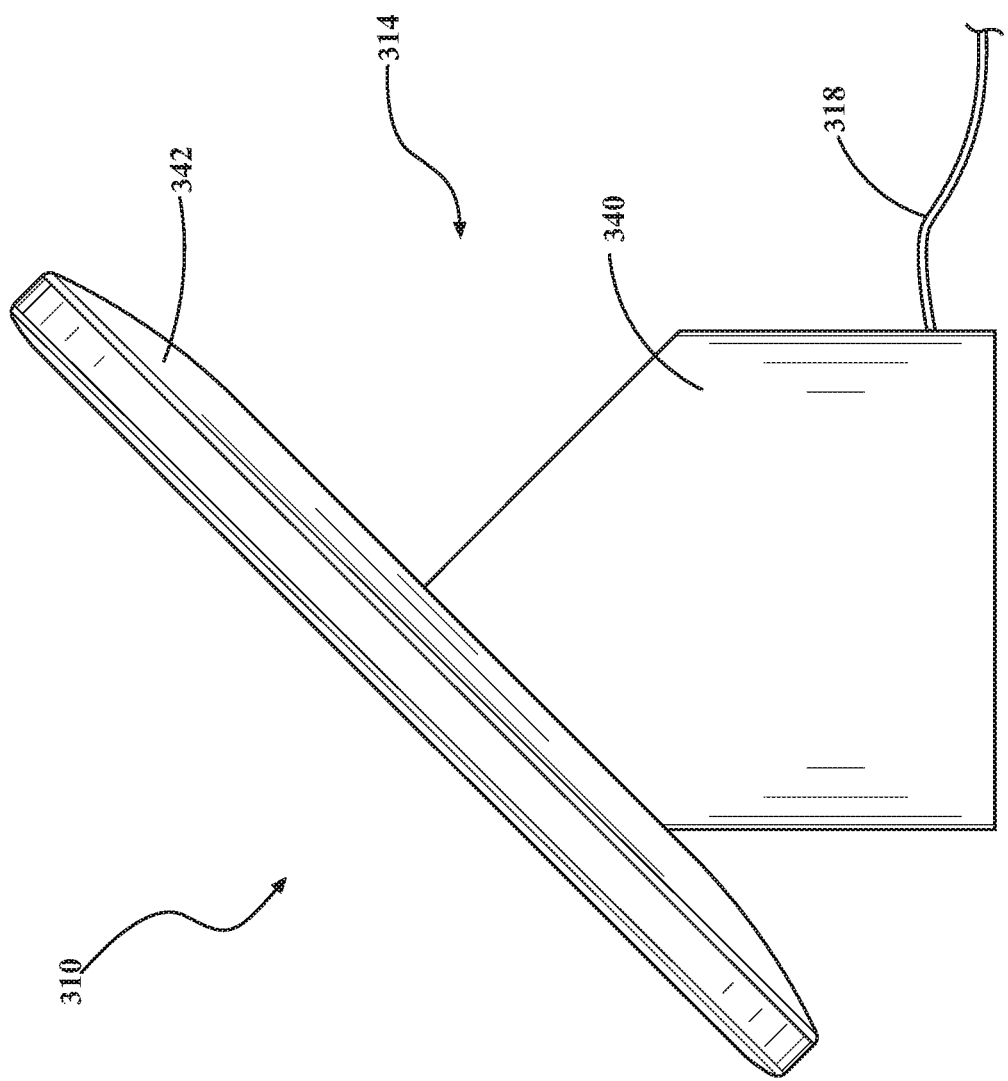
FIG. 5 depicts a side view of a tablet stand according to an embodiment.

One exemplary system for establishing simultaneous connections is provided in FIG. 4 for USB and Bluetooth connections. In a step 320, a payment card reader 316 is physically connected to a mobile device 310 using a USB cable. In a step 322, the mobile device 310 and software running thereon connect to the payment card reader 316 to establish the physical connection. In a step 324, software running on the mobile device 310 determines whether a Bluetooth connection has been established. If it has not been established, in step 326 the mobile device 310 and payment card reader 316 use the physical connection to communicate credentials (e.g. pairing credentials such as device name, secure PIN and/or encryption keys) to establish a Bluetooth connection. In the example of FIG. 4, the mobile device 310 receives the credentials from the payment card reader 316 and the details are processed by software on the mobile device 310. In a step 328, software on the mobile device 310 establishes a secure Bluetooth connection with the payment card reader 316.

In an embodiment, the Bluetooth connection is a redundant network connection, as opposed to a backup network connection. In that regard, both the USB and the Bluetooth connection are simultaneous maintained and communication between the payment card reader 316 and the mobile device 310 may take place through either network connection based upon a preference or simultaneously through each network connection. While the wireless connection is described as a Bluetooth connection, one of ordinary skill in the art will recognize that any wireless network technology may be used. While the wired network technology is described as USB, one of ordinary skill in the art will recognize that any wired network technology may be used.

In another embodiment, credentials for one network connection may be sent across that connection to authenticate the payment card reader 316 to the mobile device 310 for another network connection. For example, the payment card reader 316 may be authenticated to the mobile device 310 by sending credentials over the USB network to authenticate the payment card reader 316 to the mobile device 310 for communication over the Bluetooth network. In this manner, user interaction is not required to authenticate the Bluetooth network. In another embodiment, the physical communication connection can be used by the mobile device to communicate credentials for authenticating the mobile device to a payment card reader 316 or other device.

In a step 330, the payment card reader 316 and software on the mobile device 310 continue to communicate using the USB connection as long as, in a step 332, the mobile device 310 determines that the physical connection is present. If it is determined that the physical connection is lost, in a step 334, communication between the payment card reader 316 and the mobile device 310 reverts to Bluetooth until in the step 320 a physical connection is detected. In another embodiment, communication between the payment card reader 316 and the mobile device 310 takes place over the Bluetooth connection when both USB and Bluetooth are available unless the Bluetooth connection is interrupted. Alternatively, both wired and wireless network connections are provided and used simultaneously. In such embodiments, the wired connection and the wireless connection are both used and active and provide that even if the mobile device 310 is removed from the stand 314 (and the wired connection is interrupted), a pending payment or other transaction is not interrupted and a seamless transition of the mobile device 310 from attachment to the stand 314 to mobile use apart from the stand 314 is provided.

In alternative embodiments, the card reader 316 may be used for functions other than, or in addition to, payment transactions. In one embodiment, the card reader is used to identify customers entering a retail establishment, for example, for identification of customer membership to a club-based retail location or identification of a customer for a customer loyalty program. The card reader 316 is used to identify the customer and optionally notify staff of customer details, such as a customer that has a spend level above a certain amount, demographics of the customer or information about customer identity. The notification may also prompt a store employee to present the customer with a personalized offer or greeting. The notification may include an alert when customer details match predetermined criteria. Such alert or information may be provided on the mobile device 310 or sent from the mobile device 310 to store employees. Additionally, the card reader 316 may be used for store employee sign in or identification. In these and other embodiments, the redundant connection may allow for the card reader to be seamlessly disconnected from the wired connection without any loss of connectivity, such as for improved user experience; for example, allowing a customer card to be read at a location other than the wired connection. In these and other embodiments, the wired connection may be required for sharing certain sensitive information contained on the customer card.

Figure 6:
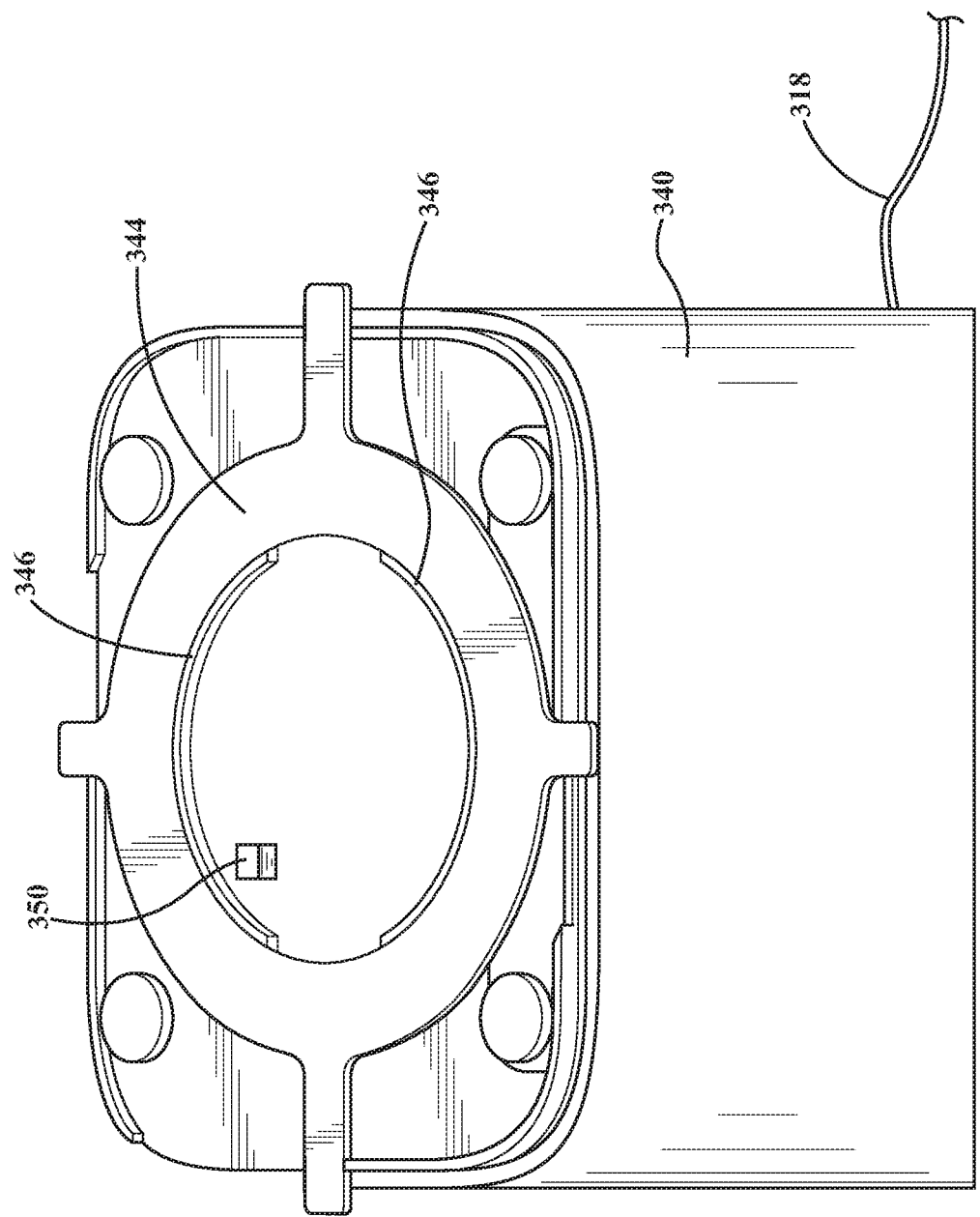
FIG. 6 depicts a front view of a base portion of a tablet stand according to an embodiment.
Figure 7:
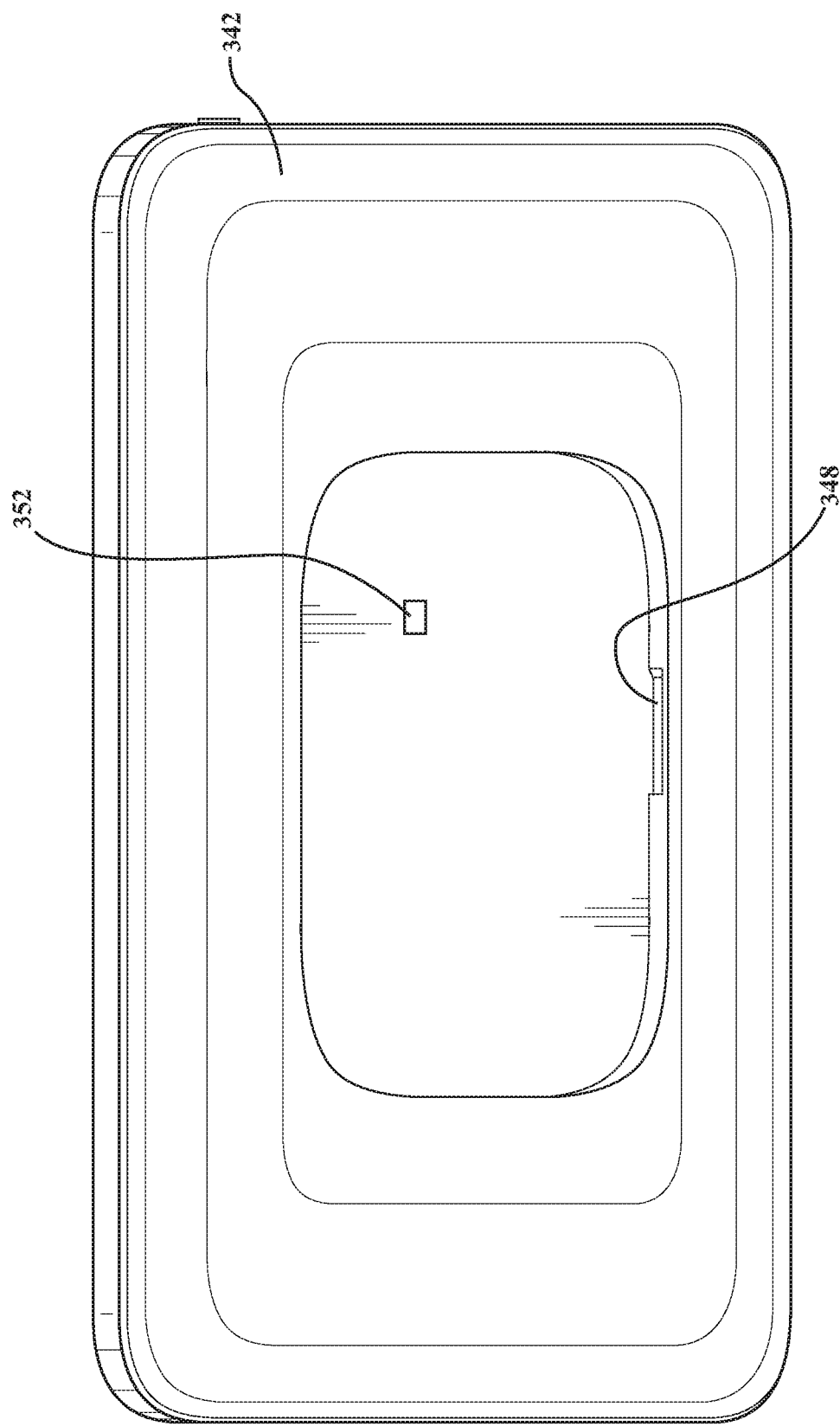
FIG. 7 depicts a rear view of a device holder portion of a tablet stand according to an embodiment.

Embodiments of the present disclosure also include methods for easily connecting the physical connection when the tablet is used in conjunction with a mobile device stand 314. Specifically, and referring to FIGS. 3 and 5-7, the mobile device stand of the preferred embodiment comprises a base portion 40 and a mobile device portion 42. As seen in FIGS. 6 and 7, the base portion 340 includes a rotating lock ring 344 with a pair of raised ribs 346 that mate with and interlock with, and unlock from, portions 348 of the mobile device portion as the locking ring is rotated. Further electrical connections 350 and 352 mate with one another as the mobile device portion 342 of the stand 314 is attached to the base portion 340 of the stand 314 to automatically make the physical connection from the payment card reader 316 to mobile device 310.

In another embodiment, the monitoring of the physical communication connection can be used to sound a continuous, periodic or short alarm, or send an alert such as by email or text message, when the physical communication connection is broken in order to monitor the location of the mobile device 310 when it is removed from the stand 314. In embodiments, certain transactions must be performed with the mobile device attached to the physical communication connection, such as a transaction which requires merchant, staff or other supervision, transaction override or refund. In other embodiments, the inputting of certain information (such as personal information in a healthcare setting) or the reading of certain cards (such as health cards or *nexus*/global entry cards) or documents (such as passports) or providing staff or customer identification or sensitive information must be performed with the mobile device attached to the physical communication connection, such as for added security. In embodiments, transactions for certain goods or services may only be completed when the mobile device is attached to the physical communication connection; for example, for purchasing cigarettes, alcohol or other transactions where an age or identity verification is required. Another example is a situation where the transaction (such as a refund) should be captured on camera (and the viewing area of the camera includes the area with the wired connection) such as to prevent fraud. Additionally, certain transaction may be required over the wired, as opposed to the wireless, connection. For example, refunds or payments for high value items may be required over a wired connection to ensure the transaction takes places in a predetermined location, such as a location monitored by camera surveillance. Additionally, some payment may be required to take place over a wired connection where the product sold is in a locked location. In such embodiment, the mobile device 310 may unlock a secure area where the high value item is stored. In such embodiments, the mobile device 310 may still communicate with the card reader 316 over the wireless connection but verify the existence of the wired connection for verification of the mobile device's 310 location.

In embodiments, the functionality of a device may be impacted by the connection status of the device. For example, a card reader 316 may read and/or transmit only non-sensitive information when connected only wirelessly and, in embodiments, may prompt a user to connect the card reader 316 with a wired connection so that the sensitive information can be read and/or transmitted. In another example, a card reader 316 may transmit only sensitive information when connected via a wired connection and may hold sensitive information in queue when a wired connection is not available and/or may prompt a user to establish a wired connection.

Throughout this disclosure the distinction between a wired and wireless connection may instead be based on the signal strength of the wireless connection. For example, if the signal strength is strong this may indicate that the device is close or in a certain location and may be leveraged in the same manner in which knowledge of a wired connection is leveraged. Throughout this disclosure the distinction between a wired and wireless connection may instead be based on the location of the devices. For example, for a location enabled device it may be possible to know the location of the device in relation to another device or location and leverage this location information in the same manner in which knowledge of a wired connection is leveraged.

The card reader may further be used to identify products, such as products that contain tagging that include bar codes or near field communication (NFC) tags or chips. In such embodiments, the card reader 316 may be used to identify the product and provide further information about the product or to facilitate checkout of the item by reading the bar code or the NFC tag. Alternatively, for example for high value, controlled and other products, a card containing a bar code or NFC tag may be provided in a retail area and the high product stored in a locked or otherwise secured location. In such embodiment, the card containing the bar code or NFC tag can be presented to the card reader 316 to determine more information about the product and/or allow unlocking of the high value product to complete the sale. In embodiments, this may be done once the transaction is complete and payment is received over the wired connection. In embodiments, the wired connection may be proximate to the secure area housing the high value, controlled or other item. In embodiments, this may place the transaction in view of cameras and other sensors or cause the transaction to occur in a high traffic area, which may act as a fraud and theft deterrent.

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g. Long Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

What is claimed is:

1. A method of communicating payment information between a payment card reader and a mobile device comprising the steps of:
   providing a physical communication connection from the payment card reader to the mobile device;
   with the mobile device, determining that a successful physical connection to the payment card reader has been established;
   determining whether a wireless communication connection has been established with the payment card reader;
   if a wireless communication connection has not been established with payment card reader, establishing a wireless communication connection with the payment card reader, wherein the physical communication connection and the wireless communication connection operate as redundant connections; and
   continuously monitoring whether the physical communication connection with the payment card reader continues and communicating information between the payment card reader and the mobile device using the physical communication connection as long as it continues and utilizing the wireless communication connection between the mobile device and the payment card reader to communicate the information when the physical communication connection is not available.

2. The method of claim 1 wherein the physical communication connection and the wireless communication connection are simultaneously active and enable an uninterrupted communication of the information between the payment card reader and the mobile device.

3. The method of claim 1 wherein the physical communication connection is authorized to perform at least one transaction that the wireless communication connection is not authorized to perform.

4. The method of claim 3 wherein the at least one transaction is one of a purchase transaction or a refund transaction.

5. The method of claim 1 wherein the physical communication connection is used by the mobile device to communicate credentials for authenticating the payment card reader to the mobile device for the wireless communication connection.

6. The method of claim 1 wherein the payment card reader is adapted to communicate with cards for identifying an existence of customers within a retail location.

7. The method of claim 6 wherein the identification of a customer within the retail location authenticates a presence of a customer for a customer loyalty program, for authenticating customer membership for admittance to the retail location, for notifying retail staff of customer details, for presenting the customer with a personalized offer or greeting, or for notifying staff of the presence of customers meeting certain criteria.

8. The method of claim 1 wherein the payment card reader is adapted to identify a product presented to the payment card reader and provide further information about the product.

9. The method of claim 8 wherein the product is identified by reading a bar code or near field communication (NFC) tag associated with the product.

10. The method of claim 1 wherein the payment card reader is adapted to facilitate checkout of the product.

11. The method of claim 1 wherein the payment card reader is adapted to facilitate access to high value products located in secure location.

12. A point of sale device comprising:
a payment card reader; and
a mobile device adapted to operate as a point of sale device for presenting information about goods or services being purchased, the mobile device capable of simultaneous physical and wireless communication connections with the payment card reader, wherein the physical and the wireless communication connections operate as redundant connections, wherein the mobile device continuously monitors whether the physical communication connection with the payment card reader continues and communicates information between the payment card reader and the mobile device using the physical communication connection as long as the physical communication connection continues and utilizes the wireless communication connection between the mobile device and the payment card reader to communicate the information when the physical communication connection is not available.

13. The point of sale device of claim 12 further comprising:
a stand comprising a base portion and a mobile device portion wherein the mobile device portion is attached to the mobile device, the base portion comprising a rotating lock ring that mates with the mobile device portion as the lock ring is rotated to removably attach the mobile device portion with the base portion.

14. The point of sale device of claim 13 wherein the physical communication connection is made between the base portion and the mobile device portion automatically as the base portion and mobile device portion are attached.

15. The point of sale device of claim 14 further comprising raised ribs on a locking ring of a base portion that selectively mate with mobile device portion.

16. The point of sale device of claim 12 wherein the physical communication connection and the wireless communication connection are simultaneously active and enable an uninterrupted communication of the information between the payment card reader and the mobile device.

17. The point of sale device of claim 12 wherein the physical communication connection is authorized to perform at least one transaction that the wireless communication connection is not authorized to perform.

18. The point of sale device of claim 17 wherein the at least one transaction is one of a purchase transaction or a refund transaction.

19. The point of sale device of claim 12 wherein the payment card reader separately presents information to customers paying with a payment card on a display of the payment card reader.

20. The point of sale device of claim 12 wherein software associated with the mobile device determines whether information is transmitted through the physical or wireless communication connection.

21. The point of sale device of claim 12 wherein the mobile device and physical communication connection are adapted to communicate credentials for authenticating the mobile device to the wireless communication connection.

22. The point of sale device of claim 12 wherein the payment card reader is adapted to communicate with cards for identifying an existence of customers within a retail location.

23. The point of sale device of claim 22 wherein the identification of a customer within the retail location authenticates a presence of a customer for a customer loyalty program, for authenticating customer membership for admittance to the retail location, for notifying retail staff of customer details, for presenting the customer with a personalized offer or greeting, or for notifying staff of the presence of customers meeting certain criteria.

24. The point of sale device of claim 12 wherein the payment card reader is adapted to identify a product presented to the payment card reader and provide further information about the product.

25. The point of sale device of claim 24 wherein the product is identified by reading a bar code or near field communication (NFC) tag associated with the product.

26. The point of sale device of claim 12 wherein the payment card reader is adapted to facilitate checkout of a product.

27. The point of sale device of claim 12 wherein the payment card reader is adapted to facilitate access to high value products located in secure location.

28. A method of communicating information between a card reader and a mobile device comprising the steps of:
providing a physical communication connection from the card reader to the mobile device;
with the mobile device, determining that a successful physical connection to the card reader has been established;
determining whether a wireless communication connection has been established with the card reader;
if a wireless communication connection has not been established with the card reader, establishing a wireless communication connection with the card reader, wherein the physical communication connection and the wireless communication connection operate as redundant connections; and
continuously monitoring whether the physical communication connection and the wireless communication connection with the card reader continues and communicating information between the card reader and the mobile device using both the physical communication connection and the wireless communication connection as long as either continues and utilizing only the wireless communication connection or the physical communication connection between the mobile device and the card device to communicate the information when the other communication connection is not available.

* * * * *